(12) United States Patent
Todoroki

(10) Patent No.: US 8,406,541 B2
(45) Date of Patent: Mar. 26, 2013

(54) IMAGE PROCESSING DEVICE AND IMAGE PROCESSING METHOD

(75) Inventor: Akinari Todoroki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 586 days.

(21) Appl. No.: 12/396,874

(22) Filed: Mar. 3, 2009

(65) Prior Publication Data

US 2009/0226104 A1 Sep. 10, 2009

(30) Foreign Application Priority Data

Mar. 4, 2008 (JP) .................................. 2008-052834

(51) Int. Cl.
G06K 9/36 (2006.01)
(52) U.S. Cl. ........................................ 382/233; 382/255
(58) Field of Classification Search .......... 382/232–253, 382/184, 842
See application file for complete search history.

(56) References Cited

U.S. PATENT DOCUMENTS

| | | | | |
|---|---|---|---|---|
| 4,121,196 A * | 10/1978 | Johnson et al. | ................ | 382/212 |
| 4,791,680 A * | 12/1988 | Yokoe et al. | ................. | 382/246 |
| 5,060,280 A * | 10/1991 | Mita et al. | ..................... | 382/283 |
| 5,121,448 A * | 6/1992 | Katayama et al. | ............ | 382/284 |
| 5,267,333 A * | 11/1993 | Aono et al. | .................... | 382/166 |
| 5,442,739 A * | 8/1995 | Saito | ............................. | 345/676 |
| 5,524,071 A * | 6/1996 | Yokomizo | .................... | 382/284 |
| 6,026,194 A * | 2/2000 | Torikai et al. | ................. | 382/232 |
| 6,115,507 A | 9/2000 | Eglit et al. | | |
| 6,549,663 B1 * | 4/2003 | Yokose et al. | ................ | 382/232 |
| 6,621,932 B2 * | 9/2003 | Hagai et al. | ................... | 382/233 |
| 6,640,011 B1 * | 10/2003 | Ichioka | ......................... | 382/232 |
| 6,697,061 B1 * | 2/2004 | Wee et al. | ...................... | 345/419 |
| 7,260,275 B2 * | 8/2007 | Shiraishi et al. | .............. | 382/284 |
| 7,336,852 B2 * | 2/2008 | Nomizu et al. | ............... | 382/284 |
| 7,668,385 B2 * | 2/2010 | Mao et al. | ..................... | 382/235 |
| 2003/0068088 A1 * | 4/2003 | Janakiraman et al. | ........ | 382/229 |
| 2005/0031215 A1 * | 2/2005 | Nomizu et al. | ............... | 382/233 |
| 2005/0081241 A1 * | 4/2005 | Chen | .............................. | 725/41 |
| 2008/0253687 A1 * | 10/2008 | Zhang et al. | .................. | 382/284 |
| 2009/0169122 A1 * | 7/2009 | He et al. | ....................... | 382/238 |

FOREIGN PATENT DOCUMENTS

| | | |
|---|---|---|
| JP | A-7-32668 | 2/1995 |
| JP | A-2001-86467 | 3/2001 |
| JP | A-2003-84738 | 3/2003 |
| JP | A-2005-115000 | 4/2005 |
| JP | A-2005-303854 | 10/2005 |

OTHER PUBLICATIONS

Rother et al "Grab Cut-interactive foreground extraction using iterated graphcuts" ACM SIGGRAPH 309-314 2004.*

* cited by examiner

*Primary Examiner* — Chan S Park
*Assistant Examiner* — Sean Motsinger
(74) *Attorney, Agent, or Firm* — Oliff & Berridge, PLC

(57) ABSTRACT

An image processing device includes: a first expansion unit which expands a part of first compression image data in a first predetermined area compressed as unit of compression to produce first expansion part data; a second expansion unit which expands a part of second compression image data in a second predetermined area compressed as unit of compression to produce second expansion part data; a cutting unit which cuts data in a predetermined range from the first expansion part data; a first producing unit which produces third expansion part data based on the cut data in the predetermined range and the second expansion part data; and a second producing unit which combines the second compression image data and compressed part data produced by compressing the third expansion part data in the second predetermined area as unit of compression to produce third compression image data.

12 Claims, 5 Drawing Sheets

IMAGE PROCESSING DEVICE AND IMAGE PROCESSING METHOD

BACKGROUND

1. Technical Field

The present invention relates to an image processing technology, and more particularly to an image processing technology performed using a plurality of compression image data.

2. Related Art

Recently, reduction of use volume of memory included in an image processing device has been demanded with increase in image quality of images to be processed or for other reason. For example, U.S. Pat. No. 6,115,507 discloses an image processing technology which performs DPCM (differential pulse code modulation) encoding for inputted images, stores compression image data in local memory, and decodes the data in the local memory at the time of data output so as to reduce use volume of memory (see JP-A-2003-84738 as well).

According to the technology shown in U.S. Pat. No. 6,115,507, however, all compression data in a source frame is decoded from the top of the data to extract necessary data at the time of writing a part of a compressed frame to another frame. Then, all compression data in a destination frame is decoded from the top of the data to write the extracted data to decode data in the destination frame. Finally, the decode data in the destination frame is compressed. Thus, the process requires extremely complicated operation and long time. This problem arises not only from the DPCM method but also from various types of compression technology employed for image processing devices.

SUMMARY

It is an advantage of some aspects of the invention to provide a technology capable of efficiently performing image processing for producing new compression image data based on a part of plural compressed image data.

An image processing device according to a first aspect of the invention includes: a first expansion unit which expands a part of first compression image data in a first predetermined area compressed as unit of compression to produce first expansion part data; a second expansion unit which expands a part of second compression image data in a second predetermined area compressed as unit of compression to produce second expansion part data; a cutting unit which cuts data in a predetermined range from the first expansion part data; a first producing unit which produces third expansion part data based on the cut data in the predetermined range and the second expansion part data; and a second producing unit which combines the second compression image data and compressed part data produced by compressing the third expansion part data in the second predetermined area as unit of compression to produce third compression image data.

The image processing device having this structure produces the third part expansion data based on the data produced by expanding a part of the first compression image data and cutting the data in the predetermined range and the data produced by expanding a part of the second compression image data, and combines the compression part data produced by compressing the third part expansion data and a part of the second compression image data to produce the third compression image data. Since the entire compression image data to be processed need not be expanded or compressed, new compression image data can be efficiently produced based on a part of the plural compressed image data. Also, since the entire compression image data to be processed need not be expanded or compressed, the memory capacity can be decreased. Moreover, the volume of data transfer can be reduced, and thus the power consumption of the image processing device can be lowered. The first predetermined area and the second predetermined area may be the same area or different areas. The first expanding unit and the second expanding unit may be substantially the same unit.

It is preferable that the first producing unit produces the third expansion part data by overwriting the cut data of the predetermined range on a predetermined position of the second expansion part data.

According to the image processing device having this structure, the first producing unit overwrites the cut data of the predetermined range on the predetermined position of the second expansion part data. Thus, the third expansion part data can be easily produced. Alternatively, as another example of data production, the cut data in the predetermined range and the data at a predetermined position of the second expansion part data may be alpha-blended or combined by other methods.

It is preferable that the image processing device further includes an image processing unit which applies predetermined image process to an image corresponding to the data in the predetermined range cut by the cutting unit. In this case, the first producing unit produces third expansion part data based on the second expansion part data and data to which the image process has been applied in place of the cut data in the predetermined range.

The image processing device having this structure applies the predetermined image process to the image corresponding to the cut data in the predetermined range to produce the third expansion part data based on the processed data and the second expansion part data. Thus, various types of data can be produced using the efficient compression image data producing method described above. The predetermined image process includes various types of process such as size expansion process, size reduction process, tone correction, and saturation correction.

It is preferable that the first compression image data and the second compression image data are data compressed with the predetermined areas as unit, having the fixed size, and that a encoder unit performs compression with the second predetermined area as a unit such that each size of compression data produced by the compression become the fixed size.

According to the image processing device having this structure, the respective sizes of the compression image data in the predetermined areas as unit of compression become fixed size. Thus, the positions storing the respective compression data on the storage medium for storing the compression data can be easily specified at the time of cutting or combining the compression image data.

It is preferable that the image processing device further includes a specifying unit which specifies each position storing compression data in the predetermined area as unit of compression including the first compression image data and the second compression image data.

The image processing device having this structure includes the specifying unit which specifies each position storing compression data in the predetermined areas as unit of compression. Thus, each position storing the compression data in the predetermined area on the storage medium storing the respective compression data can be specified even when the sizes of the compression data are not in fixed size.

It is preferable that the first predetermined area and the second predetermined area are the same area.

According to the image processing device having this structure, the first predetermined area and the second predetermined area are the same area. Thus, the structure of the device can be simplified.

It is preferable that the first predetermined area and the second predetermined area are areas containing raster for forming an image as unit.

According to the image processing device having this structure, the predetermined areas may contain raster for forming an image as unit. Alternatively, the predetermined areas may have block having predetermined size as unit.

An image processing method according to a second aspect of the invention includes: expanding a part of first compression image data in a first predetermined area compressed as unit of compression to produce first expansion part data; expanding a part of second compression image data in a second predetermined area compressed as unit of compression to produce second expansion part data; cutting data in a predetermined range from the first expansion part data; producing third expansion part data based on the cut data in the predetermined range and the second expansion part data; and combining the second compression image data and compressed part data produced by compressing the third expansion part data in the second predetermined area as unit of compression to produce third compression image data.

BRIEF DESCRIPTION OF THE DRAWINGS

The invention will be described with reference to the accompanying drawings, wherein like numbers reference like elements.

FIG. 3 illustrates a general structure of a source data expansion unit 60a.

DESCRIPTION OF EXEMPLARY EMBODIMENT

An exemplary embodiment according to the invention is hereinafter described.

A. GENERAL STRUCTURE OF PHOTO-VIEWER

Figure 1:
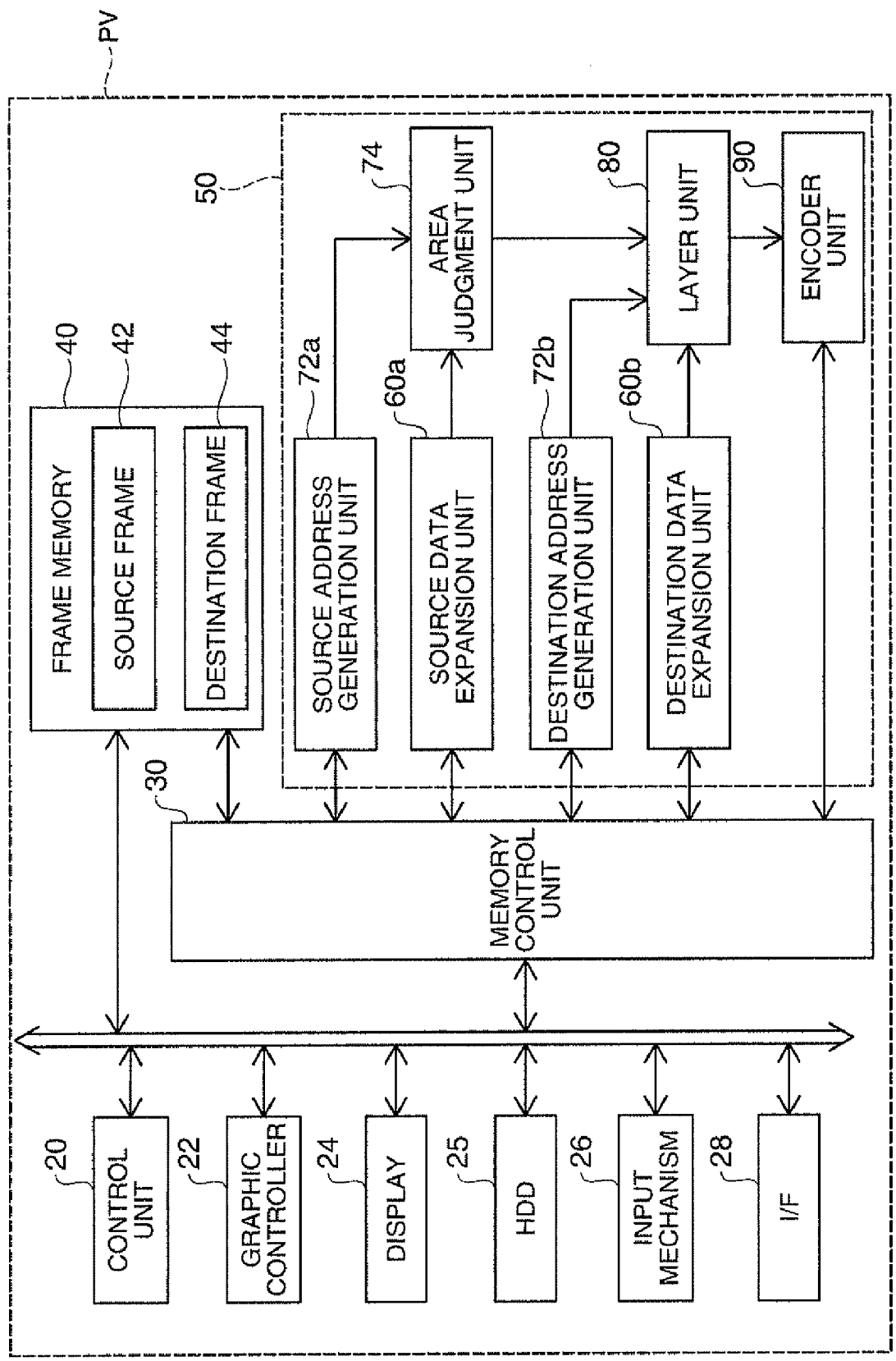
FIG. 1 illustrates a general structure of a photo-viewer PV according to an embodiment of the invention.

FIG. 1 illustrates a general structure of a photo-viewer PV according to an embodiment of the invention. The photo-viewer PV includes a control unit 20, a graphic controller 22, a display 24, a hard disk drive 25, an input mechanism 26, an interface 28, a memory control unit 30, and a frame memory 40, each of which is connected via bus.

The control unit 20 is constituted by a computer having CPU, ROM, RAM, and others, and controls the overall function of the photo-viewer PV under program stored in the ROM. The graphic controller 22 transmits drive signals to a liquid crystal type display 24 in response to commands from the control unit 20 to display images read from the frame memory 40.

The input mechanism 26 has cross-shaped cursor key and decision button. The user operates these keys for various settings and operation of the photo-viewer PV. The interface 28 is an interface for obtaining data of images to be displayed on the photo-viewer PV, and includes SD memory card slot, USB connector, and others. Image data obtained via the interface 28 is stored in the hard disk drive 25.

The frame memory 40 is a memory as buffer used for displaying images by the graphic controller 22. The figure shows a source frame 42 and a destination frame 44 stored in the frame memory 40.

The source frame 42 is image data desired to be displayed on the display 24 by the user, and is read from the hard disk drive 25 by operation of the user through the input mechanism 26. The destination frame 44 is an image showing image frame to be added to the periphery of the image to be displayed and UI (user interface) associated with operation of the photo-viewer PV. In this embodiment, the source frame 42 and the destination frame 44 are stored after compressed according to DPCM system by a encoder unit 90 to be described later for reduction of memory capacity, and expanded at the time of data output.

The memory control unit 30 is a DSP (digital signal processor) which controls overall operation associated with the frame memory 40 such as data writing to the frame memory 40 in response to commands from the control unit 20. The memory control unit 30 corresponds to a second producing unit in the appended claims. An image transfer circuit 50 operating in response to commands from the memory control unit 30 is connected with the memory control unit 30. The image transfer circuit 50 is a circuit used for image transfer process to be described later, and includes a source data expansion unit 60a, a destination data expansion unit 60b, a source address generation unit 72a, a destination address generation unit 72b, a area judgment unit 74, a layer unit 80, and the compression unit 90.

The encoder unit 90 is a compression circuit which encodes inputted image data according to DPCM system. In this embodiment, the encoder unit 90 compresses image data for each raster as unit in frames. Compression is performed such that each size of compression data compressed for each raster as unit (referred to as compression raster data) can be equalized.

Figure 2:
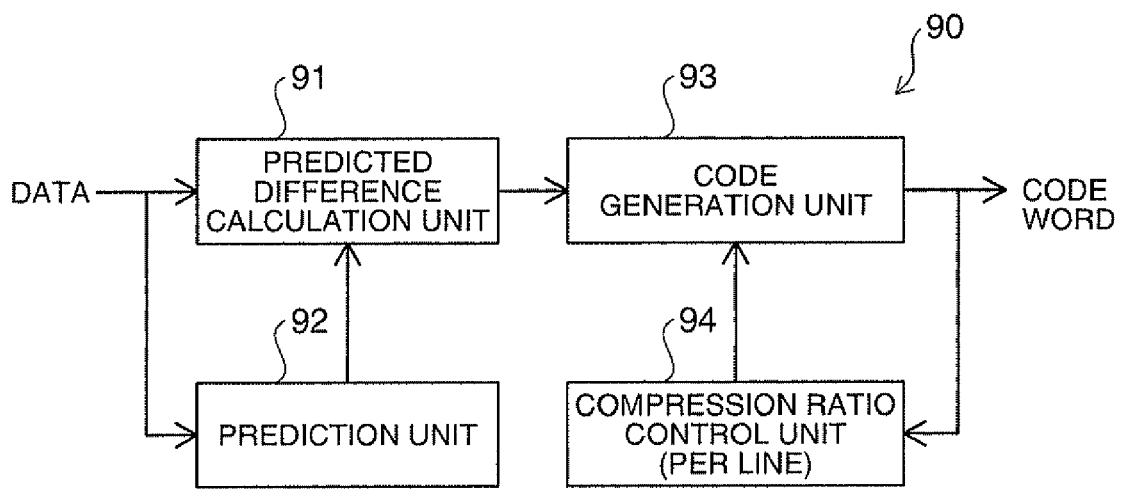
FIG. 2 illustrates a general structure of a encoder unit 90.

A structure example of the encoder unit 90 is shown in FIG. 2. The encoder unit 90 corresponds to a compressing unit in the appended claims. In this embodiment, the encoder unit 90 has a predicted difference calculation unit 91, a prediction unit 92, a code generation unit 93, and a compression ratio control unit 94. When the first gradation data is inputted to the predicted difference calculation unit 91, the predicted difference calculation unit 91 inputs the first gradation data to the code generation unit 93. Then, when Mth (M: 2 or larger integer) gradation data is inputted to the predicted difference calculation unit 91, the predicted difference calculation unit 91 receives M−1th gradation data from the prediction unit 92, calculates difference between these values, and inputs the result to the code generation unit 93. The code generation unit 93 sequentially performs encoding process based on the received difference data. The data encoded by the code generation unit 93 is supplied to the compression ratio control unit 94 as feedback data, and outputted after controlled such that compression data size can be equalized for each raster in frames.

For equalizing the compression size for each raster, the compression ratio control unit 94 monitors the size of compression data sequentially compressed and gives commands to the code generation unit 93 for switching the encoding system between lossy system and loss-less system according to the size of the compression data to control the compression ratio. Alternatively, fine adjustment for the compression data size can be provided by adding dummy data to the end of the data compressed for each raster.

The source data expansion unit 60a is an expanding circuit which converts code words encoded for each raster as unit by DPCM system into image data. Though not described herein, the destination data expansion unit 60b has a structure similar to that of the source data expansion unit 60a. The source data expansion unit 60a corresponds to a first expanding unit in the appended claims, and the destination data expansion unit 60b corresponds to a second expanding unit in the appended claims.

Figure 3:
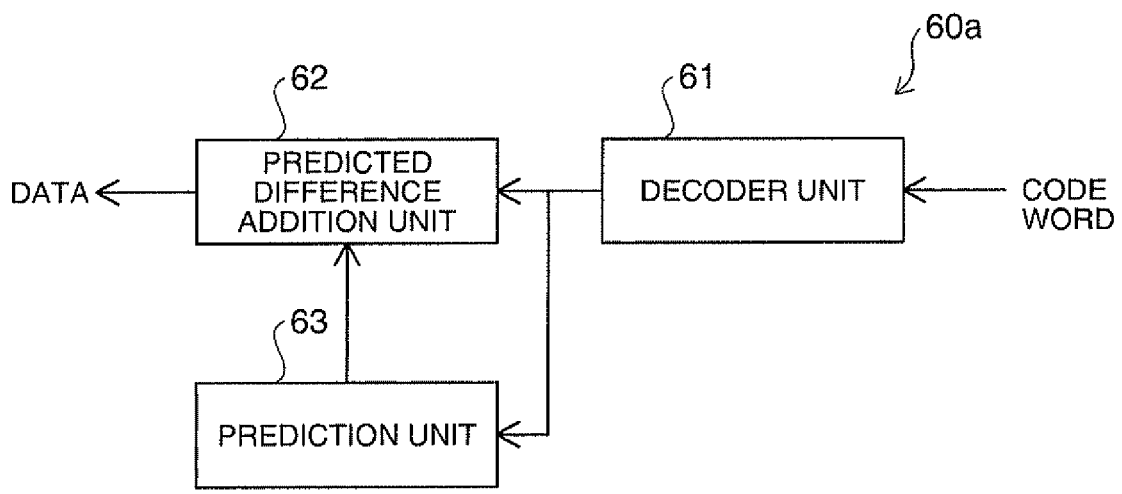

FIG. 3 shows a structure example of the source data expansion unit 60a. In this embodiment, the source data expansion unit 60a has a code interpretation unit 61, a predicted difference addition unit 62, and a prediction unit 63. When the first code word is inputted to the decoder unit 61, the decoder unit 61 interprets and decodes the code to output the decoded word to the predicted difference addition unit 62 and the prediction unit 63. Then, the predicted difference addition unit 62 outputs the received value. When the Nth (N: 2 or larger integer) code is inputted to the decoder unit 61, the decoder unit 61 sequentially decodes the code and outputs the decoded code word to the predicted difference addition unit 62 and the prediction unit 63. The prediction unit 63 adds the received values as occasion demands, and inputs the added value up to the N−1th data to the predicted difference addition unit 62 when the Nth decoded difference data is inputted to the predicted difference addition unit 62. The predicted difference addition unit 62 adds the Nth difference received from the decoder unit 61 and the added value up to N−1th code received from the prediction unit 63 and outputs the resultant value.

In this embodiment, compression or expansion is executed by DPCM (differential pulse code modulation) system using the encoder unit 90, the source data expansion unit 60a, and the destination data expansion unit 60b. However, the system for encoding is not particularly specified but may be any system as long as it can compress a predetermined range for each unit. For example, LZ system, zip system, dictionary system, ADPCM (adaptive differential pulse code modulation) system, or other various types of encoding system can be used.

The source address generation unit 72a and the destination address generation unit 72b produce address of image data to be processed in image transfer process which will be explained in "B. Image Transfer Process". The area judgment unit 74 corresponds to a cutting unit in the appended claims, and cuts image data to be transferred in the image transfer process. The layer unit 80 corresponds to a first producing unit in the appended claims, and produces predetermined image data in the image transfer process. The details of these units will be described in "B. Image Transfer Process".

B. IMAGE TRANSFER PROCESS

The image transfer process performed by the photo-viewer PV is now explained with reference to FIGS. 4 through 6. The image transfer process in this embodiment cuts a part of an image compressed and stored in the frame memory 40 and displayed on the source frame 42 and overwrites the cut image at a predetermined position of a compressed image displayed on the destination frame 44. In this embodiment, the image transfer process is performed when a picture image shot by the user using a digital still camera is extracted into the hard disk drive 25 of the photo-viewer PV to check the focused condition of the picture image on the photo-viewer PV.

More specifically, at the time of operation by the user through the input mechanism 26 to display thumbnails of the picture images extracted into the hard disk drive 25 and select one of the thumbnails, the control unit 20 refers to focus information recorded in a manufacturer note in Exif (exchangeable image file format) to automatically display an image in a predetermined range around the focused position on the display 24. In this step, the memory control unit 30 cuts a part of the source frame 42 (image around focused position) after writing the source frame 42 and the destination frame 44 read from the hard disk drive 25 and compressed by the encoder unit 90 to the frame memory 40 to overwrite the cut part at a predetermined position of the destination frame 44 as UI image. The image thus produced is expanded and displayed on the display 24. The image transfer process is now discussed in more detail.

The image transfer process starts when the user selects a desired thumbnail through the input mechanism 26 to write the selected thumbnail to the frame memory 40 as the source frame 42 and the destination frame 44. After the start of the process, the memory control unit 30 cuts compressed raster data Rs from the source frame 42 as shown in FIG. 4 (step S110).

Figure 5A:
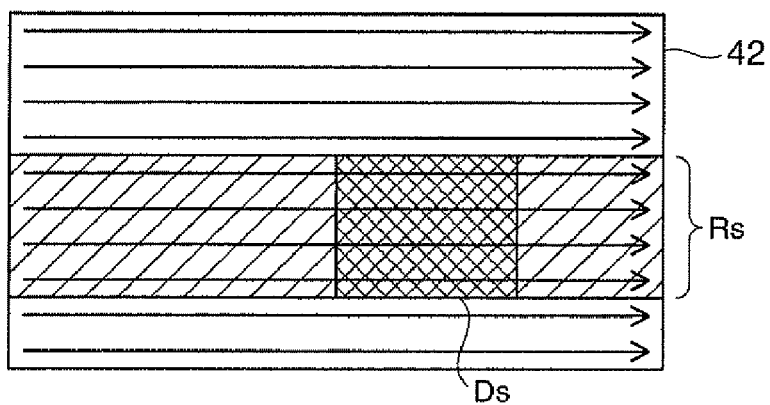
FIGS. 5A through 5C show a concept of the image transfer process.
Figure 6:
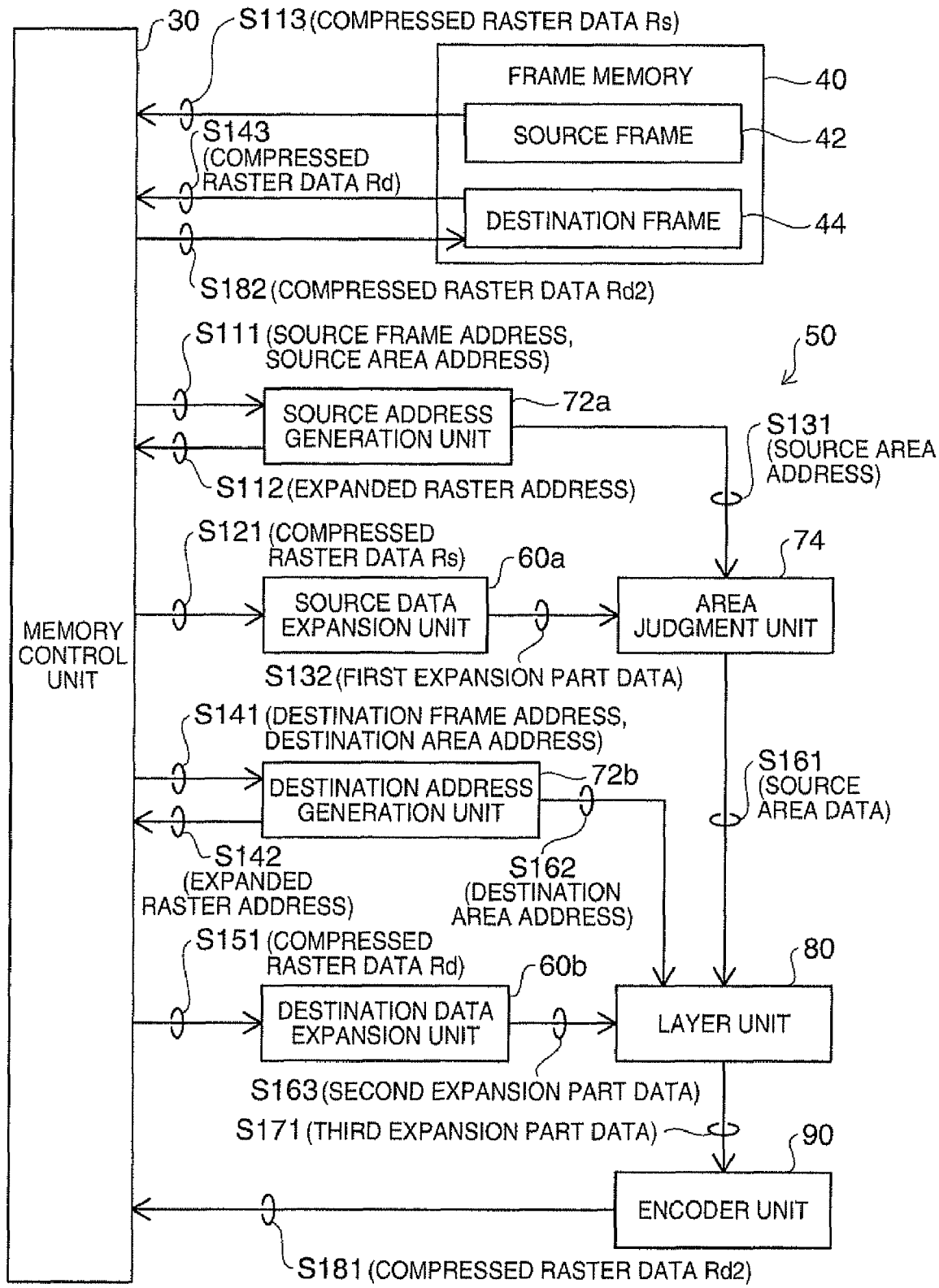
FIG. 6 shows detailed flow of the image transfer process.

More specifically, as shown in FIG. 6, the memory control unit 30 having received a command from the control unit 20 by operation of the user inputs the initial address of the source frame 42 in the frame memory 40, the frame width and height of the source frame 42, the data initial position address (X coordinate and Y coordinate) of a source area Ds desired to be transferred (see FIG. 5A), and the width and height of the source area Ds (step S111) to the source address generation unit 72a. The source area Ds is an area of the image displayed on the display 24 for checking focused condition, and information associated with the source area Ds is determined by the control unit 20 with reference to Exif information in response to the operation by the user.

Then, the source address generation unit 72a judges all addresses of the compressed raster data Rs containing the source area Ds (see FIG. 5A), and returns the corresponding address and data requirement to the memory control unit 30 (step S112). Thus, the memory control unit 30 cuts the compressed raster data Rs containing the source area Ds from the frame memory 40 based on the address and data requirement (step S113). Since the compression data size for each raster in the source frame 42 is equalized, the source address generation unit 72a can easily specify the addresses of the compressed raster data Rs.

Figure 4:
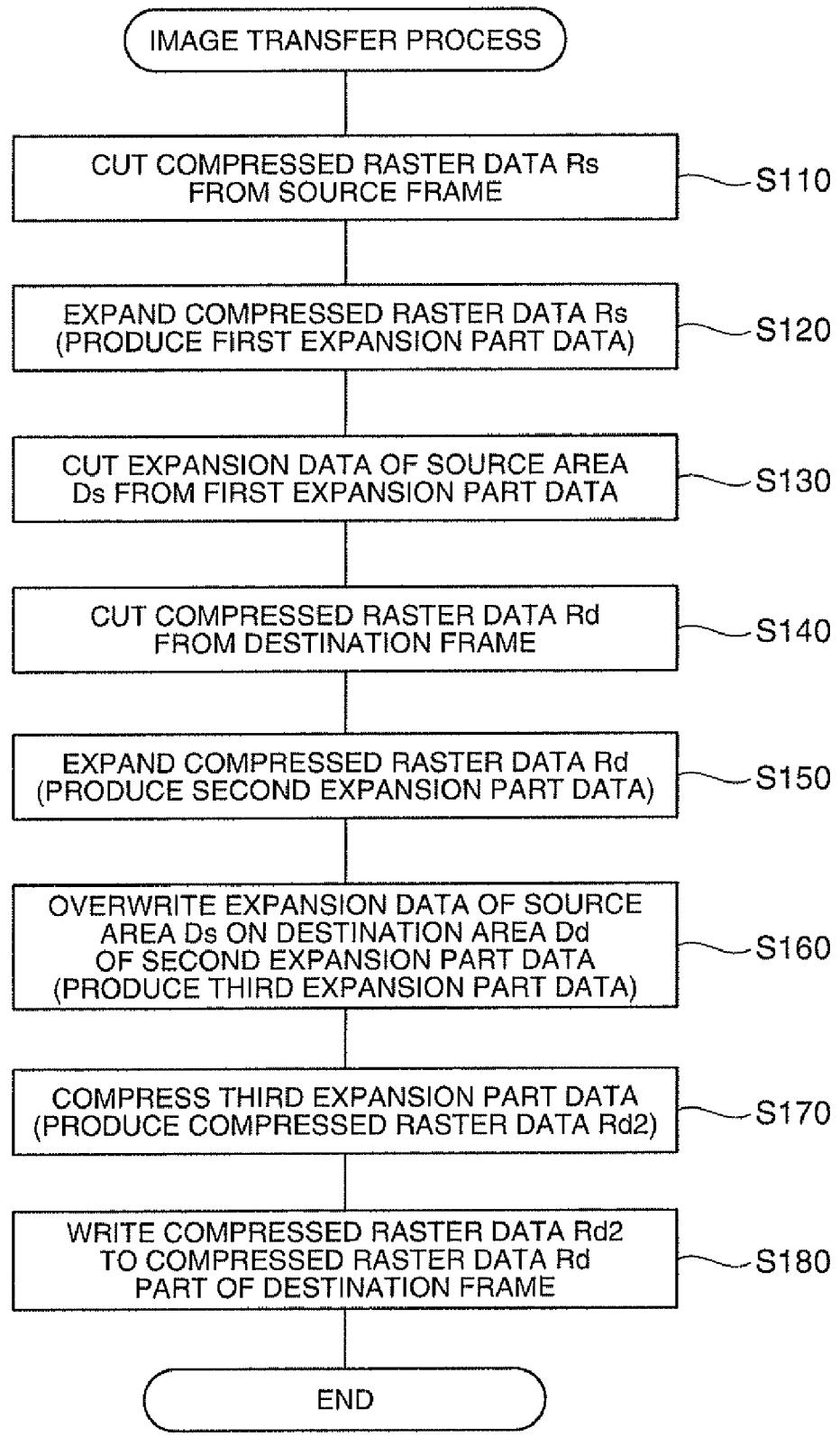
FIG. 4 is a flowchart showing flow of image transfer process.
Figure 5B:
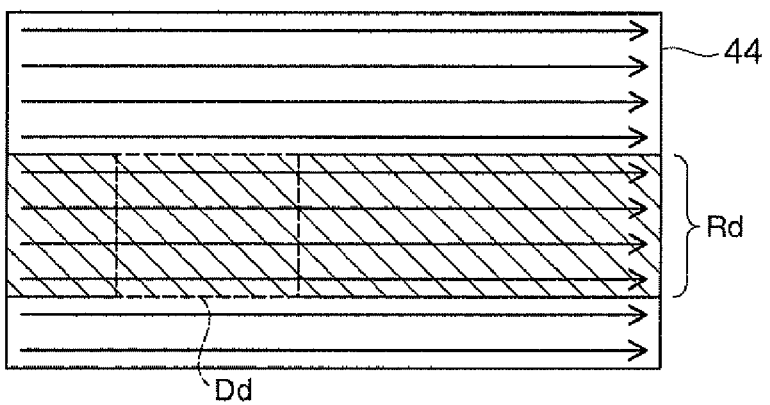
Figure 5C:
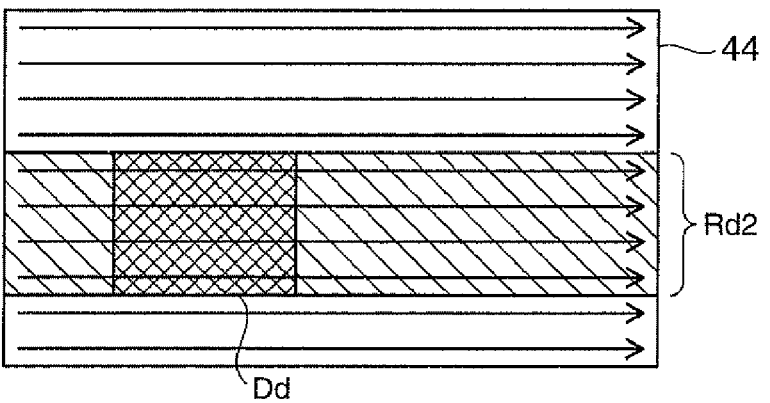

When the compressed raster data Rs is cut out, the memory control unit 30 expands the compressed raster data Rs using the image transfer circuit 50 as shown in FIG. 4 (S120). More specifically, as shown in FIG. 6, the memory control unit 30 inputs the compressed raster data Rs thus cut out to the source data expansion unit 60a (step S121) to expand the compressed raster data Rs while controlling the source data expansion unit 60a. In this embodiment, the expanded data is referred to as first expansion part data.

After expansion of the compressed raster data Rs, the memory control unit 30 cuts expansion data of the source area Ds from the first expansion part data as shown in FIG. 4 (step S130). More specifically, the source address generation unit 72a inputs the address of the source area Ds to the area judgment unit 74 in response to a command from the memory control unit 30 as shown in FIG. 6 (step S131). The address of the source area Ds is the data initial position address (X coordinate, Y coordinate) of the source area Ds and the address of the width and height of the source area Ds. The source data expansion unit 60a inputs the first expansion part data to the area judgment unit 74 in response to a command from the memory control unit 30 (step S132). Then, the area judgment unit 74 cuts the expansion data of the source area Ds from the first expansion raster data in response to a command from the memory control unit 30.

After cutting the expansion data of the source area Ds, the memory control unit 30 cuts compressed raster data Rd from the destination frame 44 as shown in FIG. 4 (step S140). More specifically, as shown in FIG. 6, the memory control unit 30 having received a command from the control unit 20 by operation of the user inputs the initial address of the destination frame 44 in the frame memory 40, the frame width and height of the destination frame 44, the data initial position address (X coordinate, Y coordinate) of a destination area Dd on which the source area Ds is to be overwritten (see FIG. 5B), and the width and height of the destination area Dd to the destination address generation unit 72b (step S141). The destination area Dd is an area on which the picture image contained in the images displayed on the display 24 for checking focus condition is shown, and information associated with the destination area Dd is determined in advance.

Then, the destination address generation unit 72b judges all addresses of the compressed raster data Rd containing the destination area Dd (see FIG. 5B), and returns the corresponding address and data requirement to the memory control unit 30 (step S142). Thus, the memory control unit 30 cuts the compressed raster data Rd from the frame memory 40 (step S143).

After cutting the compressed raster data Rd, the memory control unit 30 expands the compressed raster data Rd using the image transfer circuit 50 as shown in FIG. 4 (S150). More specifically, as shown in FIG. 6, the memory control unit 30 inputs the compressed raster data Rd thus cut out to the destination data expansion unit 60b (step S151) to expand the compressed raster data Rd while controlling the destination data expansion unit 60b. In this embodiment, the data expanded in this step is referred to as second expansion part data.

After expansion of the compressed raster data Rd, the memory control unit 30 overwrites the expansion data of the source area Ds cut from the first expansion part data on the destination area Dd of the second expansion part data using the image transfer circuit 50 as shown in FIG. 4 (step S160). More specifically, as shown in FIG. 6, the area judgment unit 74 inputs the expansion data of the source area Ds to the layer unit 80 in response to a command from the memory control unit 30 (step S161). The destination address generation unit 72b inputs the address of the destination area Dd to the layer unit 80 in response to a command from the memory control unit 30 (step S162). The address of the destination area Dd is the data initial position address (X coordinate, Y coordinate) of the destination area Dd and the address of the width and height of the destination area Dd. The destination data expansion unit 60b inputs the second expansion part data to the layer unit 80 in response to a command from the memory control unit 30 (step S163). Thus, the layer unit 80 overwrites the expansion data of the source area Ds on the destination area Dd of the second expansion part data. In this embodiment, the data thus produced is referred to as third expansion part data.

After producing the third expansion part data, the memory control unit 30 compresses the third expansion part data for each raster of the frame using the image transfer circuit 50 as shown in FIG. 4 to produce compressed raster data Rd2 (step S170). More specifically, as shown in FIG. 6, the memory control unit 30 inputs the third expansion part data from the layer unit 80 to the encoder unit 90 to compress the third expansion part data by the encoder unit 90 (step S171).

After producing the compressed raster data Rd2, the memory control unit 30 writes the compressed raster data Rd2 to the position of the compressed raster data Rd of the destination frame 44 as shown in FIG. 4 (step S180). More specifically, as shown in FIG. 6, the memory control unit 30 obtains the compressed raster data Rd2 from the encoder unit 90 (step S181) and transfers the compressed raster data Rd2 to the frame memory 40 (step S182) to write the compressed raster data Rd2 to the compressed raster data Rd part referring to the address of the compressed raster data Rd received from the destination address generation unit 72b. By this step, the image transfer process for transferring the source area Ds of the compressed source frame 42 to the destination area Dd of the compressed destination frame 44 ends.

The photo-viewer PV having this structure expands only the compressed raster data Rs as a part of the compressed source frame 42 and the compressed raster data Rd as a part of the compressed destination frame 44 to produce the first expansion part data and the second expansion part data. Then, the photo-viewer PV overwrites the expansion data of the source area Ds contained in the first expansion part data on the destination area Dd of the second expansion part data and compresses the resultant data to produce the compressed raster data Rd2. Finally, the photo-viewer PV transfers the compressed raster data Rd2 to the frame memory 40 and writes the transferred data Rd2 to the compressed raster data Rd part. In this case, the entire compression image data of the source frame 42 or the destination frame 44 need not be expanded or compressed. Thus, only a part of the compression image data can be transferred to efficiently produce new compression image data. Also, with no necessity for expansion or compression of the entire compression image data to be processed, the capacity of the frame memory 40 can be reduced, and the power consumption of the photo-viewer PV can be lowered by decreasing the volume of data transfer.

According to the photo-viewer PV having this structure, the encoder unit 90 performs compression for each raster as unit in frames such that the size of the compression data can be equalized for each raster. Thus, respective positions storing the compressed raster data in the frame memory 40 can be easily specified.

C. MODIFIED EXAMPLES

Modified examples of an embodiment according to the invention are now described.

C-1. Modified Example 1

According to the embodiment described above, the image transfer circuit 50 has the source data expansion unit 60a and the destination data expansion unit 60b as two expansion units to separately expand the compressed raster data Rs and the compressed raster data Rd. However, the compressed raster data Rs and the compressed raster data Rd may be expanded by a single expansion unit. For example, only the source data expansion unit 60a is provided as the expansion unit to switch between the area judgment unit 74 and the layer unit 80 using a switch for selection of the destination of output from the source data expansion unit 60a according to data inputted to the source data expansion unit 60a.

C-2. Modified Example 2

According to the embodiment, the encoder unit 90 compresses data for each raster as unit in frames such that each size of compression data of raster can be equalized to easily specify each storage position of the compression raster data in the frame memory 40. However, the compression size is not limited to this structure, but may be varied for each raster. For example, data may be compressed to have the maximum compression ratio by using loss-less compression system for each raster. In this case, the memory control unit 30 produces a table showing correspondence between respective compression raster data and positions in the frame memory 40 for storing the compression raster data and stores the table in the hard disk drive 25 or the like to specify the storage position of each compression raster data corresponding to the predetermined range of the expansion image with reference to the table.

C-3. Modified Example 3

According to the embodiment, the predetermined area as a unit of compression corresponds to raster in frame. However, in addition to this structure, two raster or three raster may be defined as a unit of the predetermined area. The predetermined area is not limited to raster unit but may be various types of area such as block area having predetermined size.

C-4. Modified Example 4

According to the embodiment, the predetermined area as a unit of compression has the same structure (raster unit) for the source frame 42 and the destination frame 44. Moreover, the compression system employed for the source frame 42 and the destination frame 44 is the same system (DPCM system). In this case, the image transfer circuit 50 can be simplified. However, the predetermined area may differ for the source frame 42 and the destination frame 44. Moreover, the compression system may differ for the source frame 42 and the destination frame 44. In this structure, expansion unit and encoder unit appropriate for each area and compression system are provided.

C-5. Modified Example 5

In this embodiment, the expansion data of the source area Ds cut from the first expansion part data is overwritten on the destination area Dd of the second expansion part data to produce the third expansion part data as shown in step S160 in FIG. 4. However, the third expansion part data may be other data as long as it is produced based on the expansion data of the source area Ds and the second expansion part data. For example, data produced by alpha-blending gradations in the expansion data of the source area Ds and those in the expansion data of the destination area Dd may be written to the destination area Dd. In this case, not only simple image cutting process but also various types of image processing can be performed.

C-6. Modified Example 6

According to the embodiment, the third expansion part data is produced based on the expansion data of the source area Ds cut from the first expansion part data and the second expansion part data as shown in step S160 in FIG. 4. However, the third expansion part data may be produced based on the second expansion part data and the expansion data of the source area Ds corresponding to the image to which predetermined image processing has been applied. The predetermined image processing may be various types of color correction such as size expansion process, size reduction process, tone correction, and saturation correction.

C-7. Modified Example 7

According to the embodiment, transfer process between the same memory medium (frame memory 40 in the embodiment) has been discussed. However, the technology of the invention may be employed for transfer process between different memory media such as between the frame memory 40 and the hard disk drive 25. The types of memory medium are not particularly limited. The technology of the invention is not limited to the transfer process but may be process for copying a predetermined range from a plurality of compression image data and producing new compression image data. For example, new compression image data may be produced within a frame memory from first compression image data stored in the hard disk drive 25 and second compression image data stored in the ROM. The compression image data as the base of the image processing (source frame 42 and destination frame 44 in this embodiment) is not limited to data compressed by the encoder unit 90, but may be data compressed and written to ROM or the like in advance.

C-8. Modified Example 8

A part of the structure provided by hardware in the embodiment may be replaced with a structure provided by software. Alternatively, a part of the structure provided by software in the embodiment may be replaced with a structure provided by hardware.

The invention is not limited to the embodiment described and depicted herein, but may be practiced otherwise without departing from the scope and spirit of the invention. For example, the invention is not limited the structure as a photo-viewer in the above-embodiment, but is applicable to image processing device, image processing method and the like included in digital camera, cellular phone, printer, personal computer, and other devices.

The entire disclosure of Japanese Patent Application No. 2008-052834, filed Mar. 4, 2008 is expressly incorporated by reference herein.

What is claimed is:

1. An image processing device comprising:
   a control unit configured to receive a user's selection of a part of a source area of an image to be checked for image focus;
   a first expansion unit which cuts and expands the part of the source area of first compression image data compressed in a first predetermined area as a unit of compression to produce first expansion part data;
   a second expansion unit which cuts and expands a part of a destination area of second compression image data compressed in a second predetermined area as a unit of compression to produce second expansion part data;
   a cutting unit which cuts data corresponding to the part of the source area from the first expansion part data;
   a first producing unit which produces third expansion part data by writing the cut data corresponding to the source area on the destination area of the second expansion part data; and
   a second producing unit which combines the second compression image data and compressed part data produced by compressing the third expansion part data in the second predetermined area as a unit of compression to produce third compression image data, wherein the destination area is a magnified portion of the part of the source area of the image that is selected by the user.

2. The image processing device according to claim 1, wherein the first producing unit produces the third expansion part data by overwriting the cut data of the source area on the destination area of the second expansion part data.

3. The image processing device according to claim 1, further comprising:
an image processing unit which applies a predetermined image process to an image corresponding to the data in the source area cut by the cutting unit,
wherein the first producing unit produces third expansion part data based on the second expansion part data and an image corresponding to the cut data in the source area cut by the cutting unit to which the image process has been applied.

4. The image processing device according to claim 1, wherein:
the first compression image data and the second compression image data are data compressed with the predetermined areas as a unit, having the fixed size; and
a encoder unit performs compression with the second predetermined area as a unit such that each size of compression data produced by the compression become the fixed size.

5. The image processing device according to claim 1, further comprising a specifying unit which specifies each position storing compression data in the predetermined area as unit of compression including the first compression image data and the second compression image data.

6. The image processing device according to claim 1, wherein the first predetermined area and the second predetermined area are the same area.

7. The image processing device according to claim 6, wherein the first predetermined area and the second predetermined area are areas containing raster for forming an image as unit.

8. An image processing method comprising:
receiving a user's selection of a part of a source area of an image to be checked for image focus;
expanding the part of the source area of first compression image data compressed in a first predetermined area as a unit of compression to produce first expansion part data;
expanding a part of a destination area of second compression image data compressed in a second predetermined area as a unit of compression to produce second expansion part data;
cutting data corresponding to the part of the source area from the first expansion part data;
producing third expansion part data by writing the cut data corresponding to the source area on the destination area of the second expansion part data;
combining the second compression image data and compressed part data produced by compressing the third expansion part data in the second predetermined area as a unit of compression to produce third compression image data, wherein
the destination area is a magnified portion of the part of the source area of the image that is selected by the user.

9. The image processing device according to claim 1, wherein the third expansion part data is different from the first expansion part data and the second expansion part data.

10. The method of claim 8, wherein the third expansion part data is different from the first expansion part data and the second expansion part data.

11. The image processing device of claim 1, further comprising:
a source address generation unit configured to receive information relating to the part of the source area, evaluate all memory addresses of the part of the source area based on the received information, and transmit address and data requirements of the source area based on the evaluated memory addresses;
a destination address generation unit configured to receive information relating to the destination area, evaluate all memory address of the destination area based on the received information, and transmit address and data requirements of the destination area based on the evaluated memory addresses; and
a memory control unit configured to receive the transmitted address and data requirements of the source area and the address and data requirements of the destination area, and transmit the information to the first producing unit and the second producing unit.

12. The image processing device of claim 8, further comprising:
receiving information relating to the part of the source area;
evaluating all memory addresses of the part of the source area based on the received information;
transmitting address and data requirements of the source area based on the evaluated memory addresses;
receiving information relating to the destination area;
evaluating all memory address of the destination area based on the received information; and
transmitting address and data requirements of the destination area based on the evaluated memory addresses.

* * * * *